(12) United States Patent
Guidotti et al.

(10) Patent No.: US 9,638,875 B2
(45) Date of Patent: May 2, 2017

(54) OPTICAL COMMUNICATION APPARATUS AND METHOD OF ASSEMBLING THE SAME

(71) Applicant: National Center for Advanced Packaging Co., Ltd., Wuxi, Jiangsu Province (CN)

(72) Inventors: Daniel Guidotti, Atlanta, GA (US); Haiyun Xue, Wuxi (CN); Wenqi Zhang, Wuxi (CN)

(73) Assignee: NATIONAL CENTER FOR ADVANCED PACKAGING CO., LTD., Wuxi (CN)

( * ) Notice: Subject to any disclaimer, the term of this patent is extended or adjusted under 35 U.S.C. 154(b) by 0 days.

(21) Appl. No.: 14/740,742

(22) Filed: Jun. 16, 2015

(65) Prior Publication Data
US 2016/0274320 A1  Sep. 22, 2016

(30) Foreign Application Priority Data

Mar. 17, 2015  (CN) .......................... 2015 1 0116332

(51) Int. Cl.
*G02B 6/42*  (2006.01)
(52) U.S. Cl.
CPC ......... *G02B 6/4259* (2013.01); *G02B 6/4226* (2013.01); *G02B 6/4269* (2013.01); *G02B 6/4295* (2013.01)

(58) Field of Classification Search
CPC ........................... G02B 6/4226; G02B 6/4259
See application file for complete search history.

(56) References Cited

U.S. PATENT DOCUMENTS

| | | | |
|---|---|---|---|
| 6,396,967 B1 * | 5/2002 | Suzuki ................ | H01L 25/167 257/E25.032 |
| 2009/0252455 A1 * | 10/2009 | Ohta ...................... | G02B 6/43 385/42 |
| 2012/0251033 A1 * | 10/2012 | Matsuoka ........... | G02B 6/4259 385/8 |

* cited by examiner

*Primary Examiner* — Jerry Rahill
(74) *Attorney, Agent, or Firm* — Zareefa B. Flener; Flener IP Law

(57) ABSTRACT

An optical communication apparatus comprises a laser, a laser driver chip, a photodetector, an amplifier chip, an assembling plate and at least two I/O interfaces. The laser, the laser driver chip, the photodetector and the amplifier chip are disposed on the assembling plate. The laser is connected to the laser driver chip via transmission lines and the photodetector is connected to the amplifier chip via transmission lines. A plurality of conducting vias are formed in the assembling plate, the laser driver chip and the amplifier chip are respectively connected to different I/O interfaces via electrical transmission lines passing through the conducting vias. The laser is connected to an optical fiber to transmit optical signals, and the photodetector is connected to another optical fiber to receive optical signals. A method of assembling such an optical communication apparatus is also provided.

20 Claims, 11 Drawing Sheets

OPTICAL COMMUNICATION APPARATUS AND METHOD OF ASSEMBLING THE SAME

CROSS-REFERENCE TO RELATED APPLICATIONS

This application claims the benefit and priority of Chinese patent application No. 201510116332.0 filed on Mar. 17, 2015, titled "Optical Communication Apparatus and Method of Assembling the Same", which is incorporated herein in its entirety by reference.

TECHNICAL FIELD

The disclosed embodiments relate to photoelectric communication technology, and more particularly to an optical communication apparatus and a method of assembling the optical communication apparatus.

BACKGROUND

Short-distance optical communication links are widely used in data centers and supercomputers. For example, servers and disk drives in data centers and supercomputers generally communicate via optical fibers. In order to maximize optical channel density so as to achieve high data rate transmission, optical fibers connecting emitting lasers to laser driver chips and those connecting photodetectors to amplifier chips should be as short as possible, and optical channels between transmitters and receivers should be as close as possible.

However, in the conventional optical communication apparatus, the arrangement of electrical interconnection lines between various components is not optimal, so that the structure is not compact and the volume of the apparatus is large, which increases the cost of the apparatus and difficulty of the assembling process and meanwhile reduces the efficiency of optical communication transmission.

Therefore, there is a demand to propose an optical communication apparatus with compact structure, small volume and high efficiency of optical communication transmission, as well as a method of assembling such an optical communication apparatus.

SUMMARY

Embodiments of the present invention are directed to an optical communication apparatus with compact structure, small volume and high efficiency of optical communication transmission.

Embodiments of the present invention are also directed to a method of assembling such an optical communication apparatus.

According to one or more embodiments of the present invention, there is provided an optical communication apparatus comprising a laser, a laser driver chip, a photodetector, an amplifier chip, an assembling plate and at least two I/O interfaces. The laser, the laser driver chip, the photodetector and the amplifier chip are disposed on the assembling plate. The laser is connected to the laser driver chip via transmission lines and the photodetector is connected to the amplifier chip via transmission lines. A plurality of conducting vias are formed in the assembling plate, the laser driver chip and the amplifier chip are respectively connected to different I/O interfaces via transmission lines passing through the conducting vias. A transmitter of the laser is connected to an optical fiber to transmit optical signals, and a receiver of the photodetector is connected to another optical fiber to receive optical signals.

According to one or more embodiments of the present invention, there is provided a method of assembling an optical communication apparatus, comprising:

preparing an assembling plate having conducting vias;

disposing a laser driver chip and an amplifier chip on the assembling plate;

disposing a laser on the assembling plate, connecting the laser to the laser driver chip with transmission lines, and connecting the laser to an I/O interface with transmission lines passing through the conducting vias;

disposing a photodetector on the assembling plate, connecting the photodetector to the amplifier chip with transmission lines, and connecting the photodetector to another I/O interface with transmission lines passing through the conducting vias; and connecting the transmitter of the laser to an optical fiber to transmit optical signals, and connecting the receiver of the photodetector to another optical fiber to receive optical signals.

With the optical communication apparatus and the method of assembling the optical communication apparatus, since the conducting vias are formed in the assembling plate, the components of the optical communication apparatus can be connected to each other with transmission lines passing through the conducting vias. Accordingly, the use of vertical space is optimized, the cost of the apparatus and difficulty of the assembling process is decreased, and the volume of the optical communication apparatus is minimized.

In addition, since the assembling plate may be formed of a transparent material, the laser and the photodetector can communicate with the optical fibers which are arranged in the vertical direction directly, therefore the cost of the apparatus is further decreased.

BRIEF DESCRIPTION OF DRAWINGS

These and/or other aspects will become apparent and more readily appreciated from the following description of the embodiments, taken in conjunction with the accompanying drawings in which.

DETAILED DESCRIPTION

Figure 1:
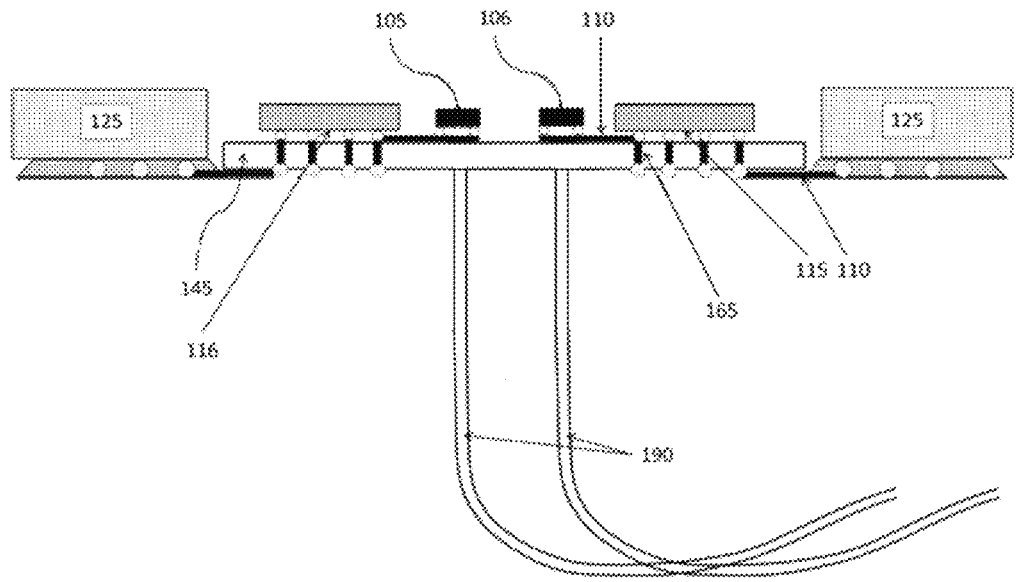
FIG. 1 is a schematic diagram illustrating an optical communication apparatus according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. The use of "may" means "in one or more embodiments".

FIG. 1 is a schematic diagram illustrating an optical communication apparatus according to an embodiment of the present invention.

As shown in FIG. 1, an optical communication apparatus according to an embodiment of the present invention comprises an assembling plate 145. A laser 105, a laser driver chip 116, a photodetector 106 and an amplifier chip 115 are disposed on the assembling plate 145. The laser 105 and the photodetector 106 are connected to the laser driver chip 116 and the amplifier chip 115 respectively via transmission lines 110.

A plurality of conducting vias 165 are formed in the assembling plate 145. The laser driver chip 116 and the amplifier chip 115 are connected to two I/O interfaces 125 respectively via transmission lines 10 passing through the conducting vias 165. The two I/O interfaces 125 may be printed circuit boards, but the present invention is not limited thereto.

A transmitter of the laser 105 is connected to an external device (not shown) via an optical fiber 190 to send optical signals, and a receiver of the photodetector 106 is connected to the external device via another optical fiber 190 to receive optical signals. That is, the optical fibers 190 act as an outputting channel of the optical signals sent from the transmitter of the laser 105 and an inputting channel of the optical signals received by the receiver of the photodetector 106, so as to achieve a two-way optical communication between the optical communication apparatus and the external device.

In operation, the laser driver chip 116 provides power supply to the laser 105, and the laser 105 converts electrical data into optical data and transmits the optical data via the optical fiber 190. The photodetector 106 receives optical data transmitted via the optical fiber 190 and converts it into electrical data. The electrical data is amplified by the amplifier chip 115.

In an embodiment, Edge Emitting Lasers (EELs) or Vertical Cavity Surface Emitting Laser (VCSELs) may be used in the optical communication between optical fibers or polymer waveguides. Similarly, the photodetector 106 may be an edge receiving photodetector or a surface receiving photodetector. In addition, the photodetector 106 may be a p-type/intrinsic/n-type (PIN) photodetector.

If the laser 105 is formed of an EEL, the laser is output from side ends of the transmitter of the laser 105. In this case, the transmitter of the laser 105 may be connected to a laser steering device formed of polymer or steering lenses, so as to guide the optical signals to the optical fiber 190 which is arranged in the vertical direction. And then the optical signals are transmitted to the external device via the optical fiber 190.

If the laser 105 is formed of a VCSEL, due to low power consumption and circular emission mode field of VCSEL, the laser 105 is easy to match the optical fiber 190 which is cylindrically symmetric. Since the laser beams from the laser 105 are transmitted in a direction perpendicular to the emission end surface, after the emission end surface is aligned and coupled with an optical fiber end face, the optical signals are transmitted from the transmitter of the laser 105 to the external device via the optical fiber 190 directly.

Similarly, if the photodetector 106 is formed of an edge receiving photodetector, it can receive optical signals transmitted via the optical fiber 190 by utilizing a laser steering device formed of polymer or steering lenses. And if the photodetector 106 is formed of an surface receiving photodetector, the receiver of the photodetector 106 may be connected to the optical fiber 190 directly to receive the optical signals from the external device, since the photodetector 106 is easier to match the end surface of the optical fiber 190 compared with other types of photodetectors so that there is less loss of the optical signals during coupling of end surfaces.

Besides EEL or VCSEL, the laser 105 may be formed of other types of lasers, therefore the present invention is not limited thereto. Similarly, the types and structure of the photodetector 106 and the laser steering device are not limited in the present invention.

It will be apparent for those skilled in the art that there may be a plurality of lasers 105 and a plurality of photodetectors 106. The plurality of lasers 105 may be arranged in a laser array, and the plurality of photodetectors 106 may be arranged in a photodetector array. Similarly, there may be a plurality of laser driver chips 116 and a plurality of amplifier chips 115. In order to transmit a large amount of data, the number of optical fibers 190 may be increased also.

The number of the lasers 105 may be different from that of the laser driver chips 116. For example, the plurality of lasers 105 which form a laser array may be connected to a same laser driver chip 116. Alternatively, the plurality of lasers 105 may be connected to a plurality of laser driver chips 116 respectively and the number of the laser driver chips 116 may be less than that of the lasers 105. Similarly, the number of the photodetectors 106 may be different from that of the amplifier chips 115.

In an embodiment, the laser driver chip 116 and the amplifier chip 115 may be manufactured using a Silicon On Insulator (SOI) substrate and an advanced Complementary Metal Oxide Semiconductor (CMOS) process, so as to minimize the heat generated by laser driver chip 116 and the amplifier chip 115. Further, in order to minimize the volume of the optical communication apparatus, the laser driver chip 116 and the amplifier chip 115 may be made with flip-chip technology. In addition, the optical fibers may be bundled into a 4-72 core optical fiber ribbon to achieve optical fiber integration, or a multi-core optical fiber can be used to increase data transfer rates.

In an embodiment, the assembling plate 145 may be formed of a transparent material such as glass. In addition, a wavelength of waves which are allowable to pass through the assembling plate 145 may be the same as a wavelength of waves emitted by the laser 105, for example 850 nm. However, the present invention is not limited thereto.

Since the conducting vias 165 are formed in the assembling plate 145, the components of the optical communication apparatus can be connected to each other with transmission lines 110 passing through the conducting vias 165. Accordingly, the use of vertical space is optimized, the cost of the apparatus and difficulty of the assembling process is decreased, and the volume of the optical communication apparatus is minimized.

In addition, since the assembling plate 145 may be formed of a transparent material, the laser 105 and the photodetector 106 can communicate with the optical fibers 190 which are arranged in the vertical direction directly, without the need to additionally forming optical fiber communication conducting vias, therefore the cost of the apparatus is further decreased.

Figure 2:
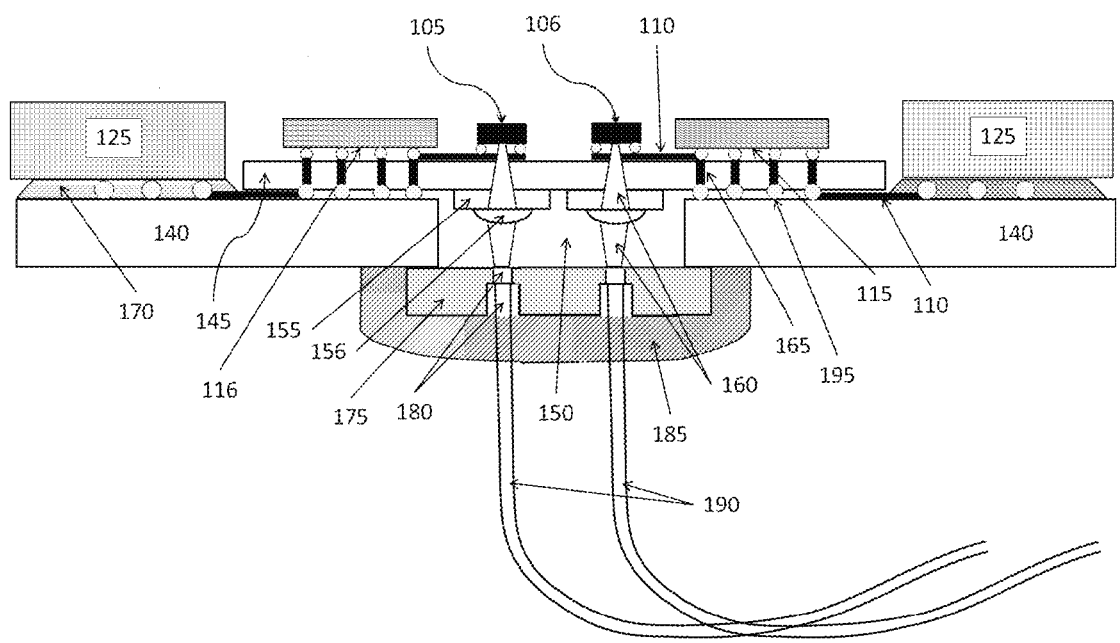
FIG. 2 is a schematic diagram illustrating an optical communication apparatus according to another embodiment of the present invention.

FIG. 2 is a schematic diagram illustrating an optical communication apparatus according to another embodiment of the present invention. As shown in FIG. 2, two lenses 156 formed of glass material and aligned with the laser 105 and the photodetector 106 respectively are further disposed under the lower surface of the assembling plate 145. The lenses 156 are used to perform light collimation for the light beams from/to the optical fibers 190. The principle of light collimation can be referred with the taper shape 160 shown in FIG. 2.

In an embodiment, a support plate 140 may be provided under the assembling plate 145 to provide mechanical and electrical support for the assembling plate 145 and the transmission lines 110. The support plate 140 has a cavity 150 in which the two lens 156 are disposed, and the I/O interfaces 125 are fixed on the upper surface of the support plate 140 with an electrically insulating adhesive 170.

In an embodiment, an optical fiber alignment template plate 175 is disposed under the support plate 140 to assist alignment between the optical fibers 190 and the lenses 156, and is fixed to the lower surface of the support plate 140 with an adhesive 185. The optical fiber alignment template plate 175 has two dual diameter holes 180 through which the optical fibers 190 pass to be aligned with the two lenses 156 respectively. Each dual diameter hole 180 has an upper portion with a smaller diameter and a lower portion with a larger diameter. An optical fiber protection buffer layer of the optical fiber 190 is located in the lower portion, and a core and a cladding of the optical fiber 190 are located in the upper portion.

In an embodiment, two glass plates 155 are disposed on the lower surface of the assembling plate 145 to support the two lenses 156 respectively.

It is apparent for those skilled in the art that the number of the lenses 156 and that of the glass plates 155 can be varied according to change of number of the lasers 105, the photodetectors 106 and the optical fibers 190.

Except for the above-mentioned structure, the optical communication apparatus according to this embodiment of the present invention is substantially the same as that according to the embodiment shown in FIG. 1, repeated description will be omitted in order to avoid redundancy.

Figure 3:
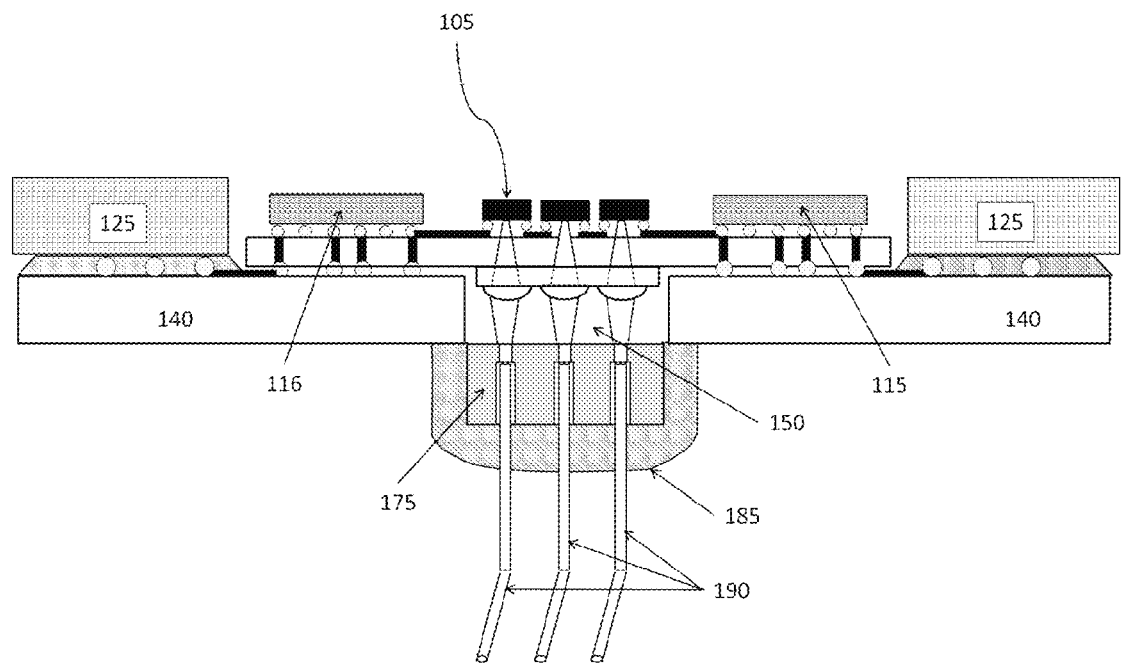
FIG. 3 is a schematic diagram illustrating an optical communication apparatus according to still another embodiment of the present invention.

FIG. 3 is a schematic diagram illustrating an optical communication apparatus according to still another embodiment of the present invention. As shown in FIG. 3, there are three lasers 105 which form a laser array. The photodetector array corresponding to the laser array is not shown in FIG. 3 for clarity. The photodetector array may include three or less photodetectors 106.

Except for the above-mentioned structure, the optical communication apparatus according to this embodiment of the present invention is substantially the same as that according to the embodiment shown in FIG. 2, repeated description will be omitted in order to avoid redundancy.

Figure 4:
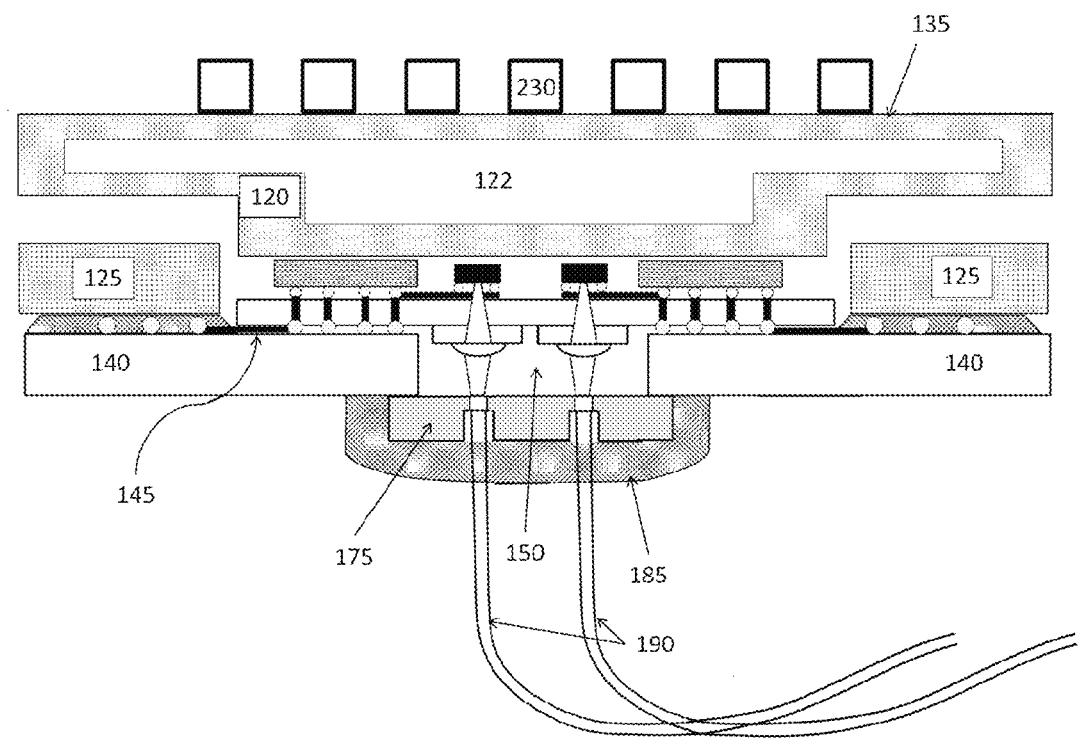
FIG. 4 is a schematic diagram illustrating an optical communication apparatus according to yet another embodiment of the present invention.
Figure 5:
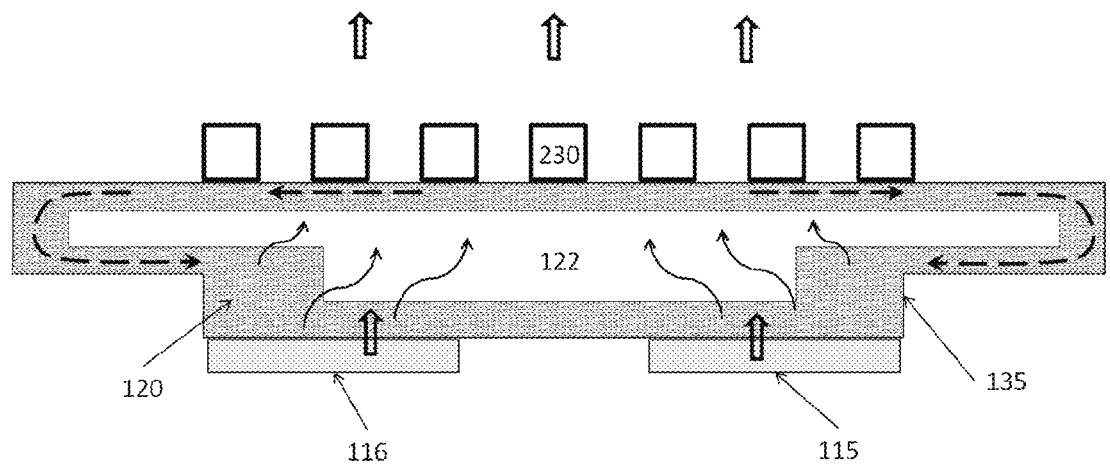
FIG. 5 is a schematic diagram illustrating a heat exchanger in an optical communication apparatus in FIG. 4.

FIG. 4 is a schematic diagram illustrating an optical communication apparatus according to yet another embodiment of the present invention, and FIG. 5 is a schematic diagram illustrating a heat exchanger in an optical communication apparatus in FIG. 4.

Referring to FIG. 4, a heat exchanger 135 is provided above the laser driver chip 116 and the amplifier chip 115, and fits with at least one of the laser driver chip 116 and the amplifier chip 115 to maintain good thermal contact. Heat generated by the laser driver chip 116 and the amplifier chip 115 may be dissipated by the heat exchanger 135.

In an embodiment, in order to increase the thermal dissipating efficiency of the heat exchanger 135, a plurality of heat sinks 230 are provided on the upper surface of the heat exchanger 135 to increase contact area between the heat exchanger 135 and the air outside. As shown in FIG. 4, each of the heat sinks 230 may have a shape of a fin, for example a low profile fin which has a small volume and a good heat dissipating effect.

Referring to FIG. 5, the heat exchanger 135 includes a liquid fluid circulation region 120 fitting with at least one of the laser driver chip 116 and the amplifier chip 115 and a gaseous fluid circulation chamber 122 surrounded by the liquid fluid circulation region 120. The liquid fluid circulation region 120 may include a net-shape structure formed of a fiber material, and liquid fluid flows circularly in the net-shape structure. Since the upper surface of the liquid fluid circulation region 120 of the heat exchanger 135 contacts the air outside, the liquid fluid circulation region 120 can act as a cooling zone for transferring heat.

Specifically, as shown in FIG. 5, a flowing direction of heat is indicated by double line arrows, a flowing direction of the gaseous fluid is indicated by curved solid arrows, and a flowing direction of the liquid fluid is indicated by dashed line arrows. When the liquid fluid flows to a lower part of the liquid fluid circulation region 120 which is adjacent to the amplifier chip 115 and the laser driver chip 116, heat generated by the amplifier chip 115 and the laser driver chip 116 is transferred to the liquid fluid with a relatively low temperature, and then the liquid fluid becomes gaseous fluid due to the heat. The gaseous fluid flows into the gaseous fluid circulation chamber 122. When spreading to an upper part of the liquid fluid circulation region 120 which is adjacent to the external environment, the gaseous fluid is cooled to liquid fluid and returns to the net-shape structure in the liquid fluid circulation region 120. The cooled liquid fluid flows to the lower part of the liquid fluid circulation region 120 again and absorbs heat generated by the amplifier chip 115 and the laser driver chip 116. With circulation of fluid, the heat generated by the amplifier chip 115 and the laser driver chip 116 is dissipated to the external environment.

In order to further increase the effect of heat dissipation, additional cold sources may be provided above the heat exchanger 135.

With the heat exchanger 135, the heat generated by the amplifier chip 115 and the laser driver chip 116 can be dissipated effectively, which reduces the working temperature of the amplifier chip 115 and the laser driver chip 116 and greatly improves performance and service life of the optical communication apparatus.

Except for the above-mentioned structure, the optical communication apparatus according to this embodiment of the present invention is substantially the same as that according to the embodiment shown in FIG. 2, repeated description will be omitted in order to avoid redundancy.

Figure 6:
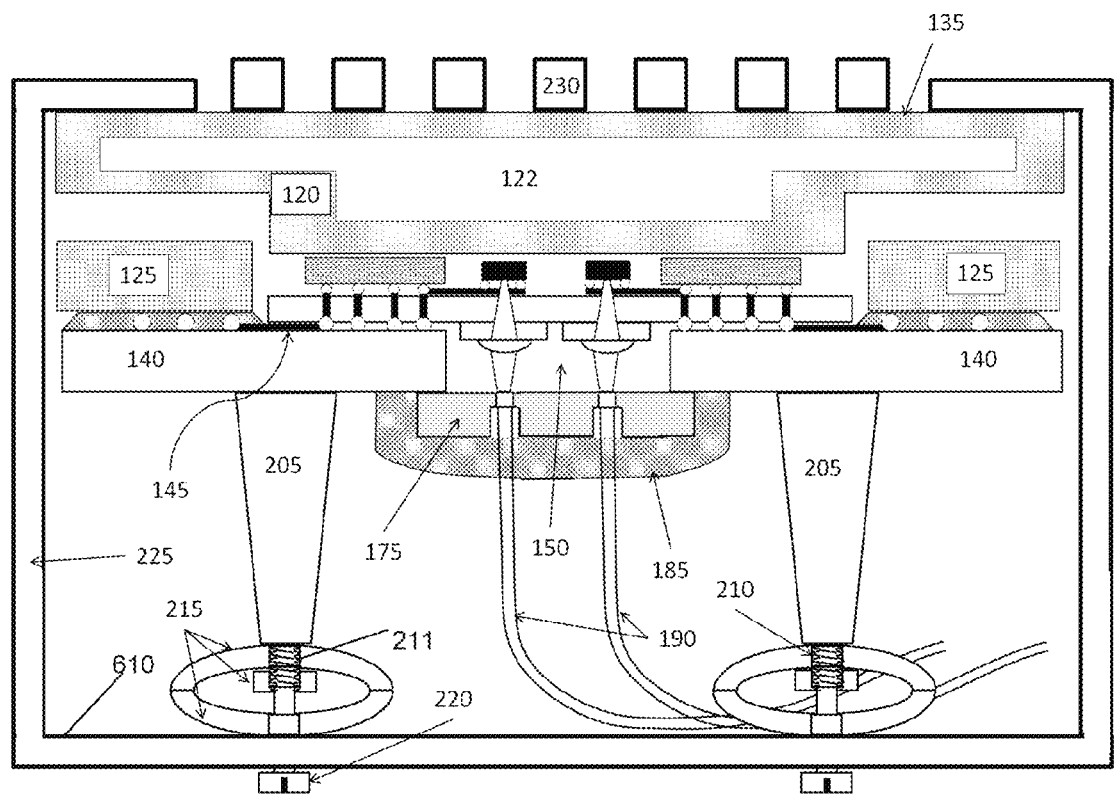
FIG. 6 is a schematic diagram illustrating an optical communication apparatus according to yet another embodiment of the present invention.

FIG. 6 is a schematic diagram illustrating an optical communication apparatus according to yet another embodiment of the present invention.

Referring to FIG. 6, a cage wall 225 is further provided to accommodate the laser 105, the laser driver chip 116, the photodetector 106, the amplifier chip 115 and the assembling plate 145 therein.

In an embodiment, the cage wall 225 has an opening under which the heat exchanger 135 is disposed.

In an embodiment, two adjustable spring mechanisms 215 are provided on a bottom plate 610 of the cage wall 225. Each of the adjustable spring mechanisms 215 includes a screw 220, a threaded hole 210 and a spring 211. The screw 220 passes through the threaded hole 220. The spring 211 supports the assembling plate 145 through a supporting member 205, and the assembling plate 145 moves up and down as the screw 220 moves in the threaded hole 220.

Specifically, by turning the screw 220, the screw 220 moves up and down in the threaded hole 210, and the spring 211 attached to the end of the screw 220 will be tightened or released. With actions of the supporting member 205 and the support plate 140, the assembling plate 145 moves up and down so as to adjust contact pressure between the heat exchanger 135 and the heat sinks 230, as well as contact pressure between the amplifier chip 115, the laser driver chip 116 and the liquid fluid circulation region 120. Variation of contact pressures achieves adjustment of efficiency of heat transfer.

In order to ensure a good rigidity of interior structure of the optical communication apparatus and avoid interference to the curved optical fibers 190 by the spring 211, the spring 211 is required to have a small size. In this case, the supporting member 205 is required to have a large size to meet the requirement of rigid supporting. Therefore, the supporting member 205 provides not only good rigid supporting, but also an enough gap for the curved optical fibers 190, so that the end coupling of the optical fibers 190 is not affected when the shafts of the optical fibers 190 are bended to circular arcs.

The size of the supporting member 205 is not limited in the present invention. Also, the number of the heat sinks 230, the adjustable spring mechanisms 215 and the supporting members 205 is not limited in the present invention.

Except for the above-mentioned structure, the optical communication apparatus according to this embodiment of the present invention is substantially the same as that according to the embodiment shown in FIG. 4, repeated description will be omitted in order to avoid redundancy.

Figure 7:
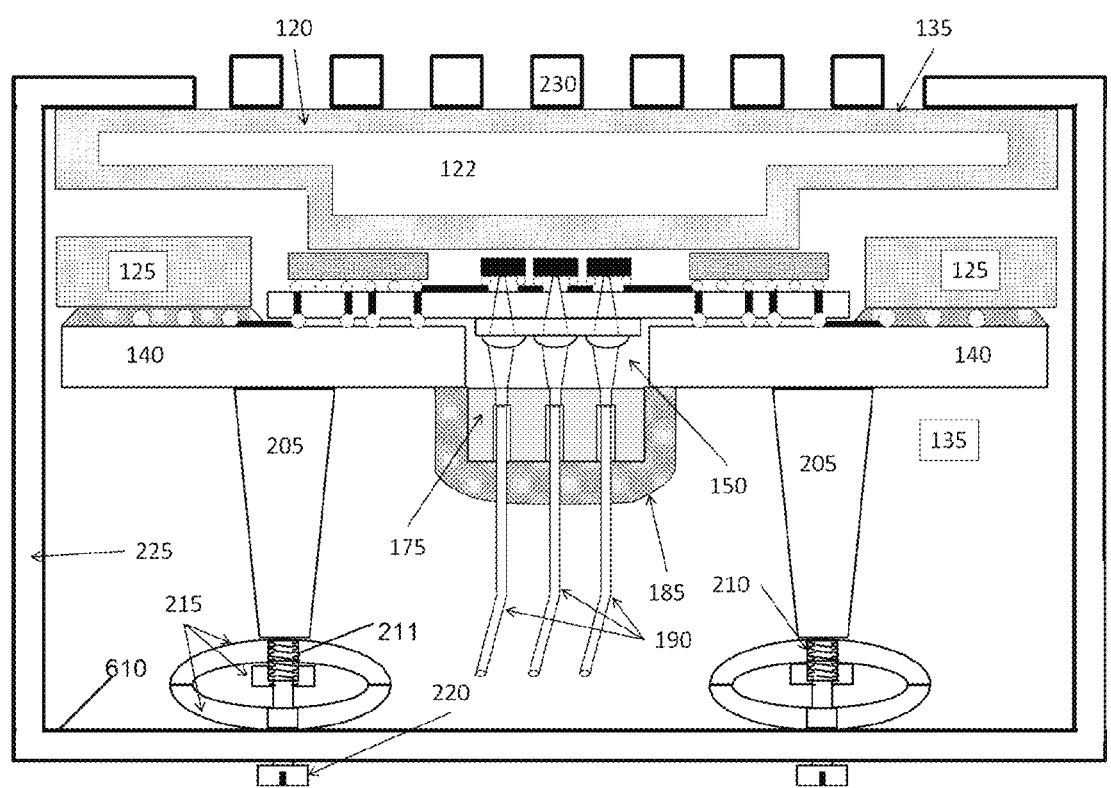
FIG. 7 is a schematic diagram illustrating an optical communication apparatus according to yet another embodiment of the present invention.

FIG. 7 is a schematic diagram illustrating an optical communication apparatus according to yet another embodiment of the present invention. Except there are three lasers 105 as shown in FIG. 7 and three or less photodetectors 106 (not shown), the optical communication apparatus according to this embodiment of the present invention is substantially the same as that according to the embodiment shown in FIG. 6, repeated description will be omitted in order to avoid redundancy.

Figure 8:
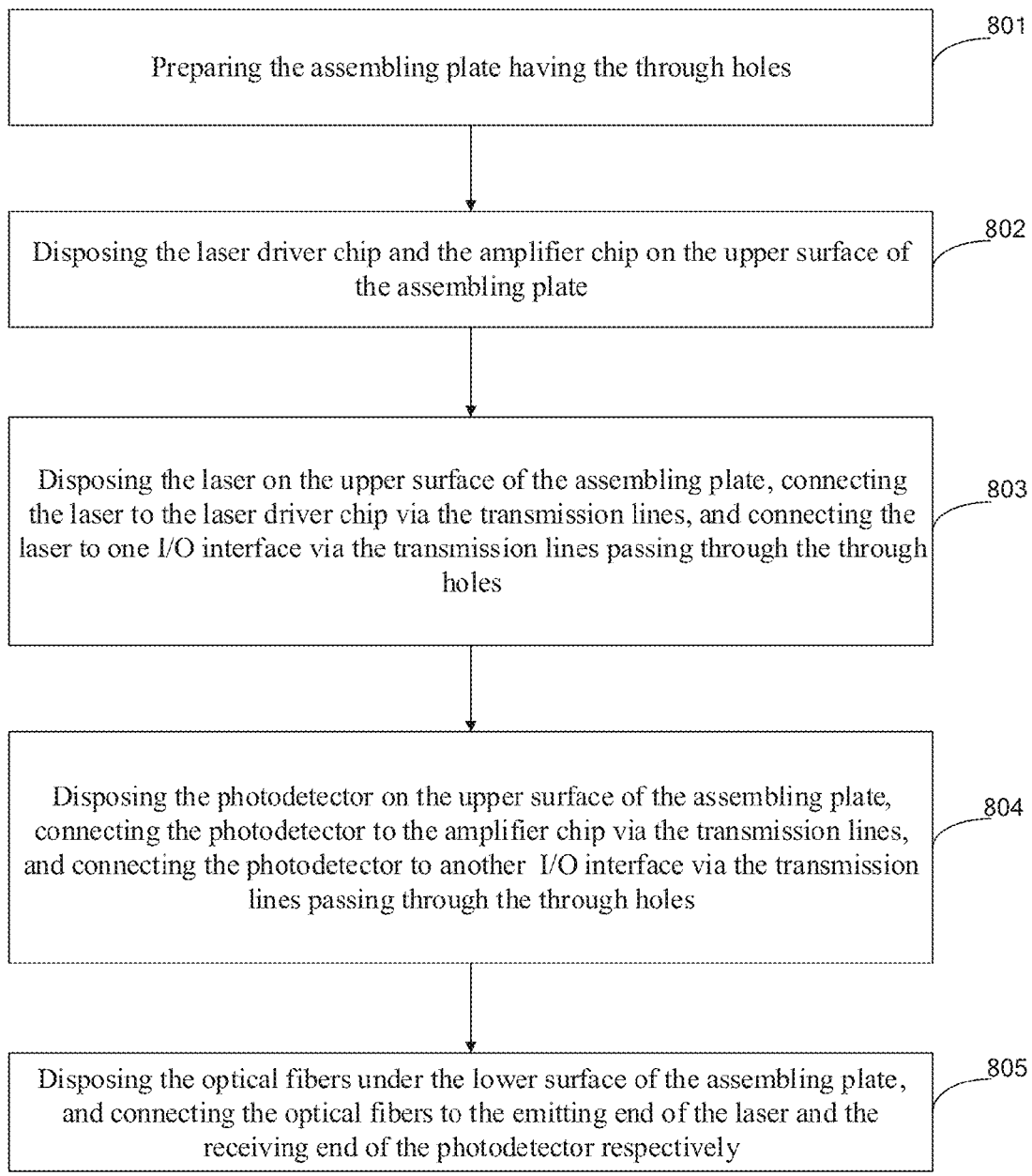
FIG. 8 is a flow diagram illustrating a method of assembling an optical communication apparatus according to an embodiment of the present invention.

FIG. 8 is a flow diagram illustrating a method of assembling an optical communication apparatus according to an embodiment of the present invention.

As shown in FIG. 8, at step 801, the assembling plate 145 having the conducting vias 165 is prepared.

Next, at step 802, the laser driver chip 116 and the amplifier chip 115 are disposed on the upper surface of the assembling plate 145 using flip-chip technology.

At step 803, the laser 105 is disposed on the upper surface of the assembling plate 145 using flip-chip technology, and is connected to the laser driver chip 116 via the transmission lines 110. In addition, the laser 105 is connected to one I/O interface 125 via the transmission lines 110 passing through the conducting vias 165.

At step 804, the photodetector 106 is disposed on the surface of the assembling plate 145 using flip-chip technology, and is connected to the amplifier chip 115 via the transmission lines 110. In addition, the photodetector 106 is connected to another I/O interface 125 via the transmission lines 110 passing through the conducting vias 165.

Finally, at step 805, the optical fibers 190 are disposed under the lower surface of the assembling plate 145, and are connected to the transmitter of the laser 105 and the receiver of the photodetector 106 respectively, so as to achieve transmission of the optical signals from the transmitter of the laser 105 and receiving of the optical signals to the receiver of the photodetector 106, which will be further described with reference to FIG. 9.

Figure 9:
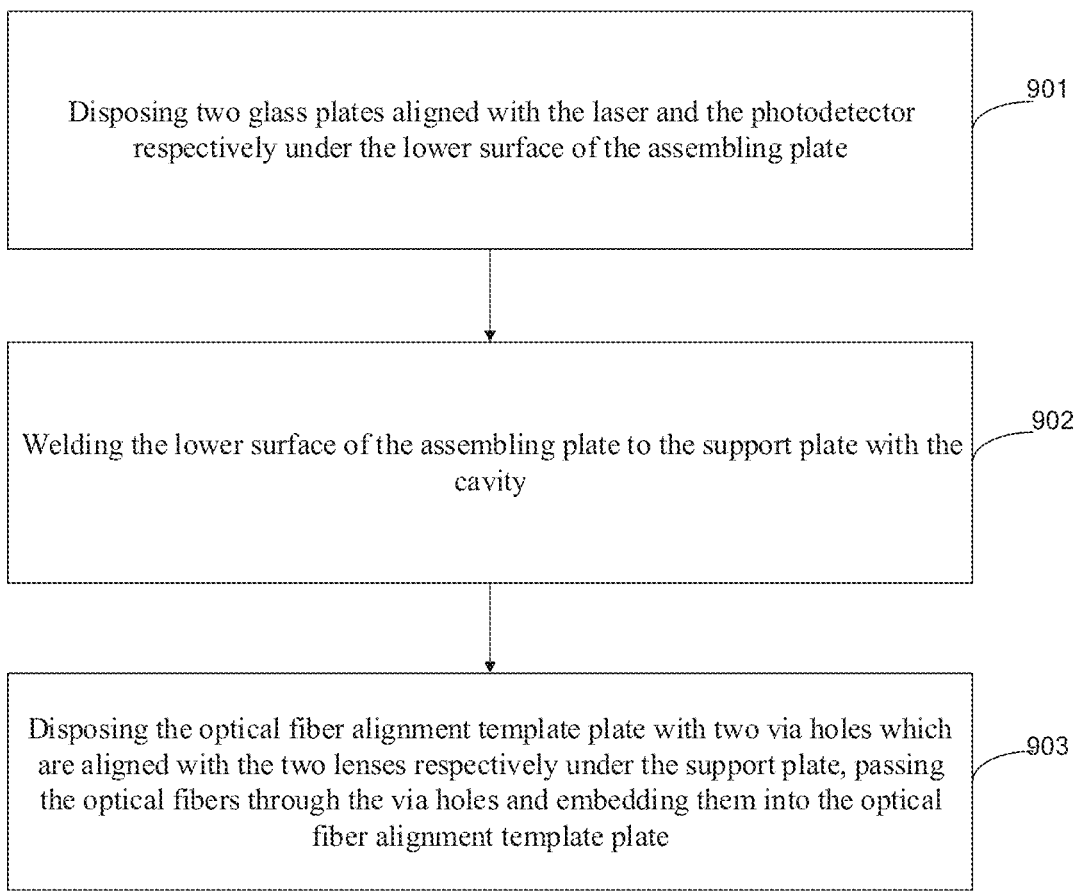
FIG. 9 is a flow diagram illustrating a method of achieving transmission of optical signals from an optical communication apparatus and receiving of optical signals to the optical communication apparatus.

Referring to FIG. 9, at step 901, two glass plates 155 aligned with the laser 105 and the photodetector 106 respectively are disposed under the lower surface of the assembling plate 145. In an embodiment, the two glass plates 155 are disposed on the lower surface of the assembling plate 145 to support the two lenses 156 respectively.

Next, at step 902, the lower surface of the assembling plate 145 is welded to the support plate 140 with the cavity 150 using flip-chip welding without flux. Here the two lenses 156 are located in the cavity 150.

Finally, at step 903, the optical fiber alignment template plate 175 with two dual diameter holes 180 which are be aligned with the two lenses 156 respectively is disposed under the support plate 140. The optical fibers 190 pass through the dual diameter holes 180 and are embedded into the optical fiber alignment template plate 175, so as to achieve transmission of the optical signals from the transmitter of the laser 105 and receiving of the optical signals to the receiver of the photodetector 106.

In an embodiment, each dual diameter hole 180 has an upper portion with a smaller diameter and a lower portion with a larger diameter. When passing the optical fibers 190 through the dual diameter holes 180, firstly an optical fiber sheath with a length L1 is cut to expose an optical fiber buffer coating layer, and then the optical fiber buffer coating layer with a length L2 is cut to expose bare optical fiber with only cladding. Here, L2<L1. The bare optical fiber is inserted to the upper portion of the dual diameter hole 180 from the lower portion of the dual diameter hole 180, and the upper end of the optical fiber 190 is in the same plane as the lower end of the cavity 150. An optical fiber array having a plurality of optical fibers may be inserted simultaneously with the above-mentioned method.

In an embodiment, the optical fibers 190 which are aligned with the two lenses 156 respectively may be fixed with the adhesive 185.

It will be understood by those skilled in the art that the sequence of the above-mentioned steps can be changed. For example, if all components of the optical communication apparatus are accommodated in the cage wall 225, the support plate 140 may be mounted to the cage wall 225 firstly, and then the assembling plate 145 is welded to the support plate 140, afterwards the laser driver chip 116 and the amplifier chip 115 are welded to the assembling plate 145. The present invention is not limited to a specific sequence of steps.

Figure 10:
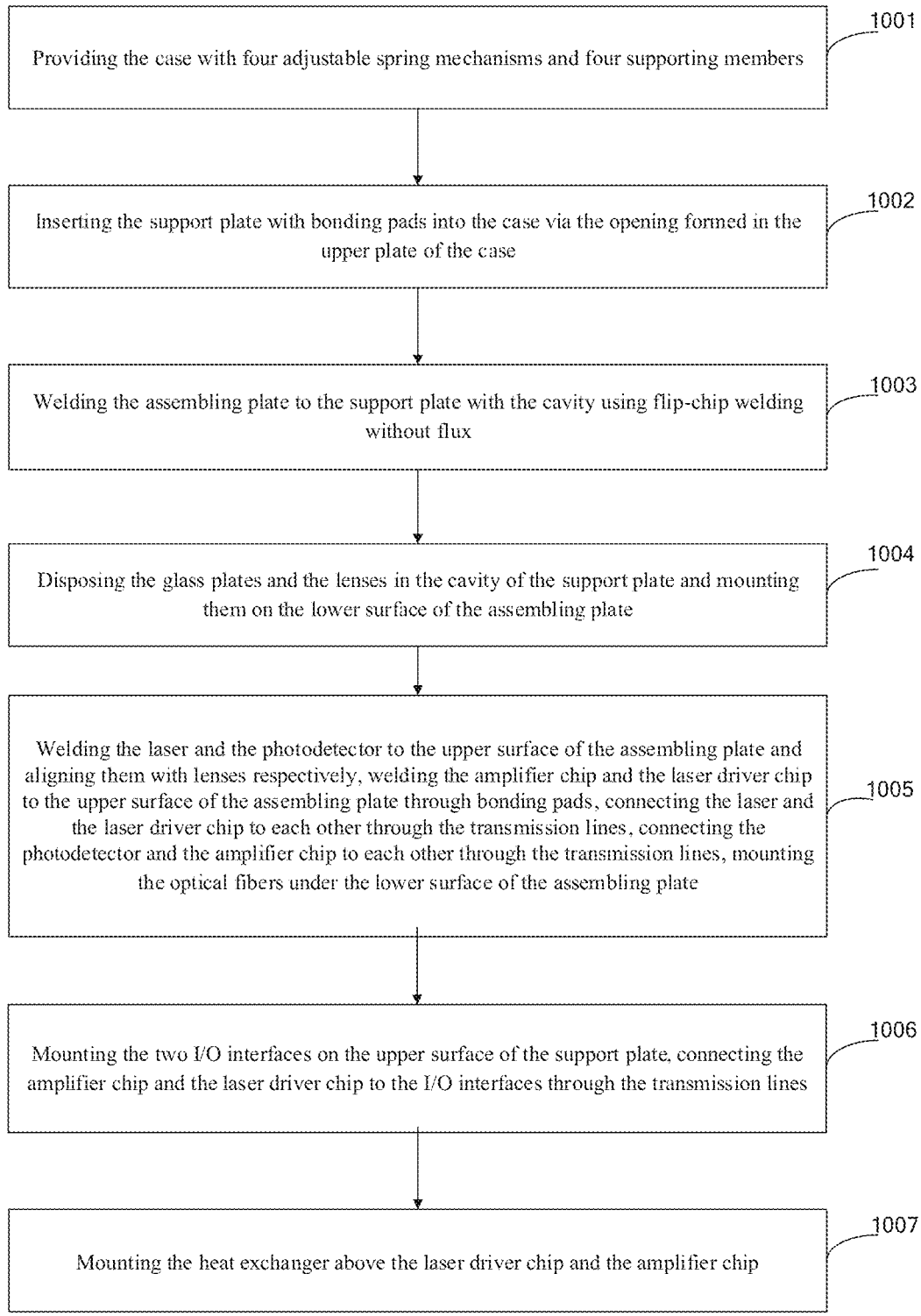
FIG. 10 is a flow diagram illustrating a method of assembling an optical communication apparatus according to another embodiment of the present invention.

FIG. 10 is a flow diagram illustrating a method of assembling an optical communication apparatus according to another embodiment of the present invention, and FIG. 11a-11g are schematic diagrams illustrating steps of a method of assembling an optical communication apparatus shown in FIG. 10.

Figure 11A:
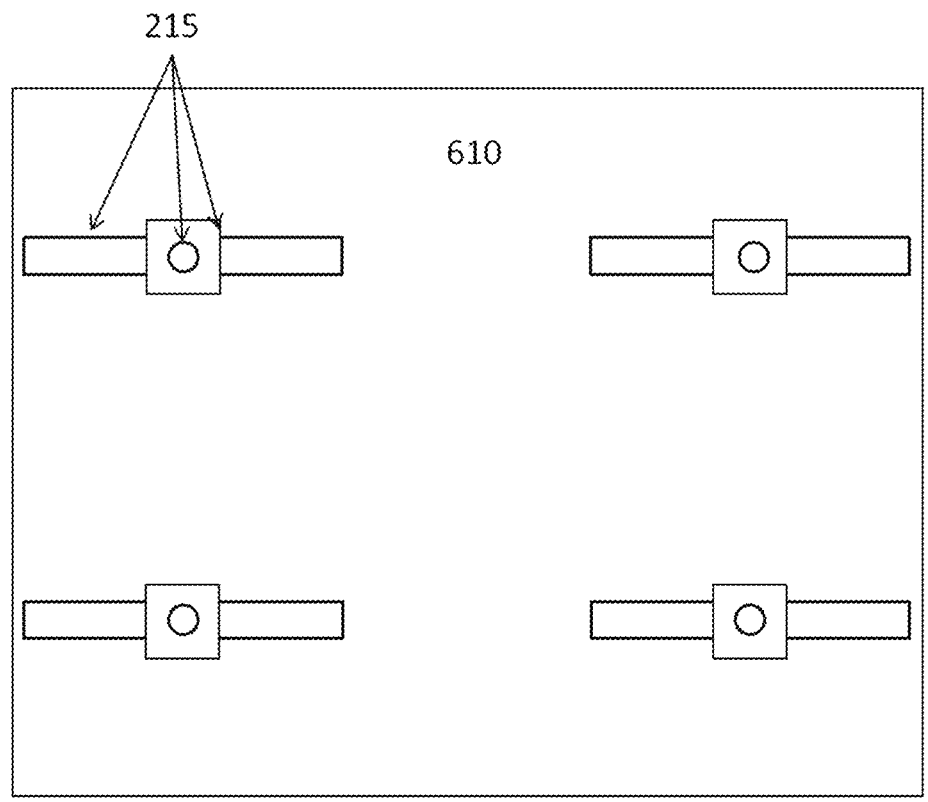
FIG. 11a-11g are schematic diagrams illustrating steps of a method of assembling an optical communication apparatus shown in FIG. 10.

Referring to FIG. 10 and further referring to FIG. 11a, at step 1001, the cage wall 225 with four adjustable spring mechanisms 215 and four supporting members 205 is provided. Here, the four adjustable spring mechanisms 215 are mounted on the bottom plate 610 of the cage wall 225.

Figure 11B:
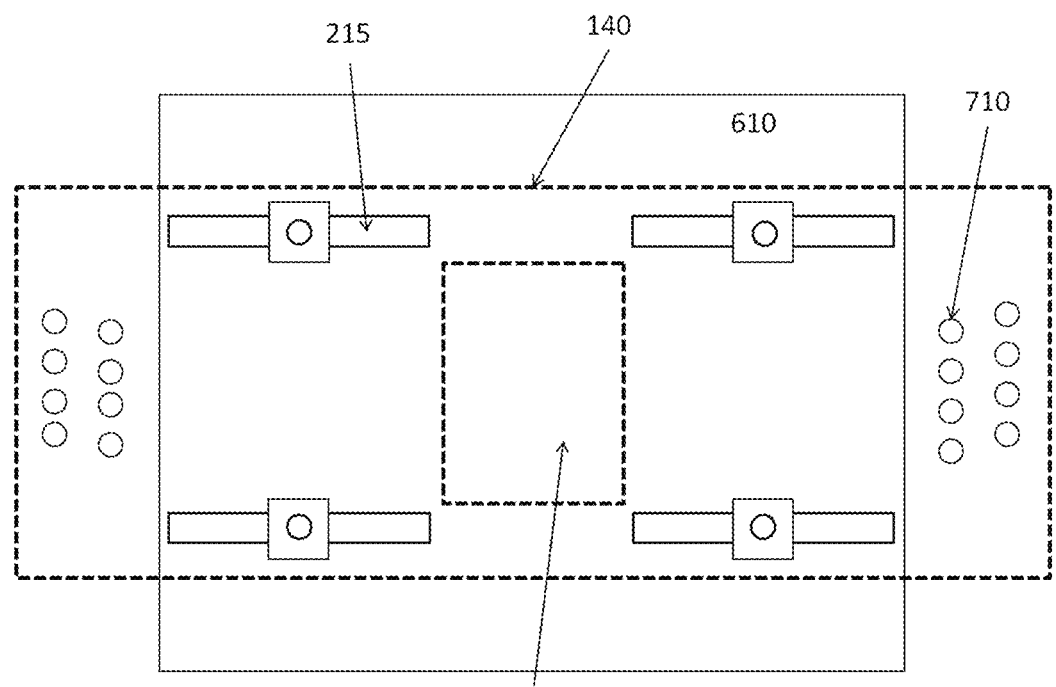

At step 1002, referring to FIG. 11b, the support plate 140 with bonding pads 710 are inserted into the cage wall 225 via the opening formed in the upper plate of the cage wall 225. In an embodiment, the adjustable spring mechanisms 215 may be compressed to provide more space for the insertion of the support plate 140.

Figure 11C:
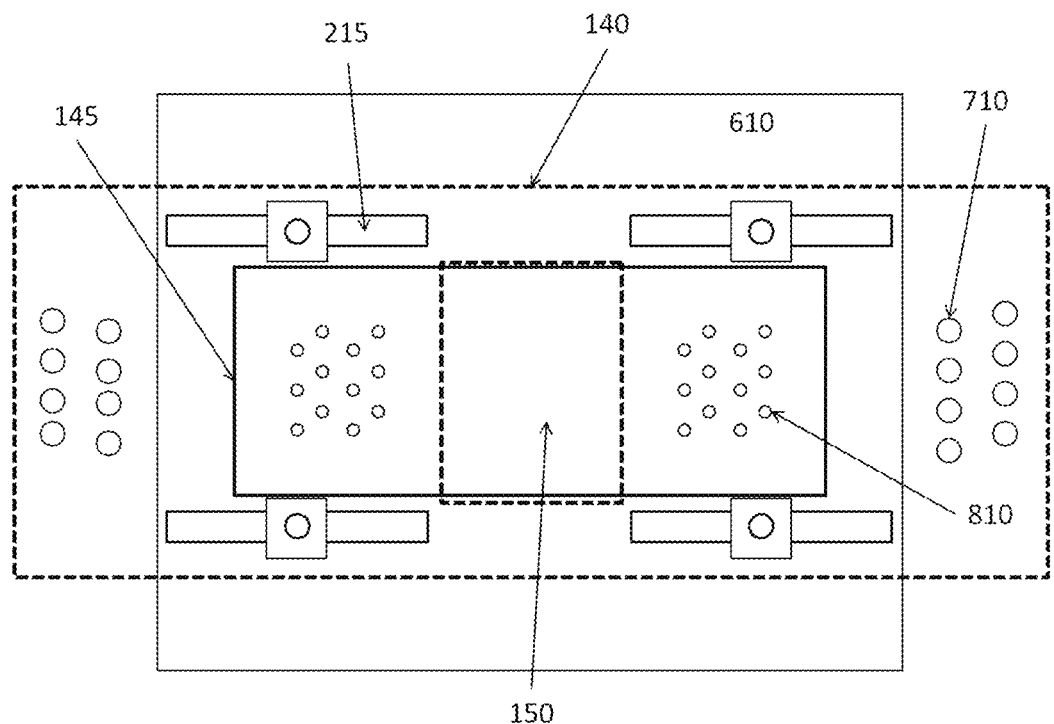

At step 1003, referring to FIG. 11c, the assembling plate 145 is welded to the support plate 140 with the cavity 150 using flip-chip welding without flux.

Figure 11D:
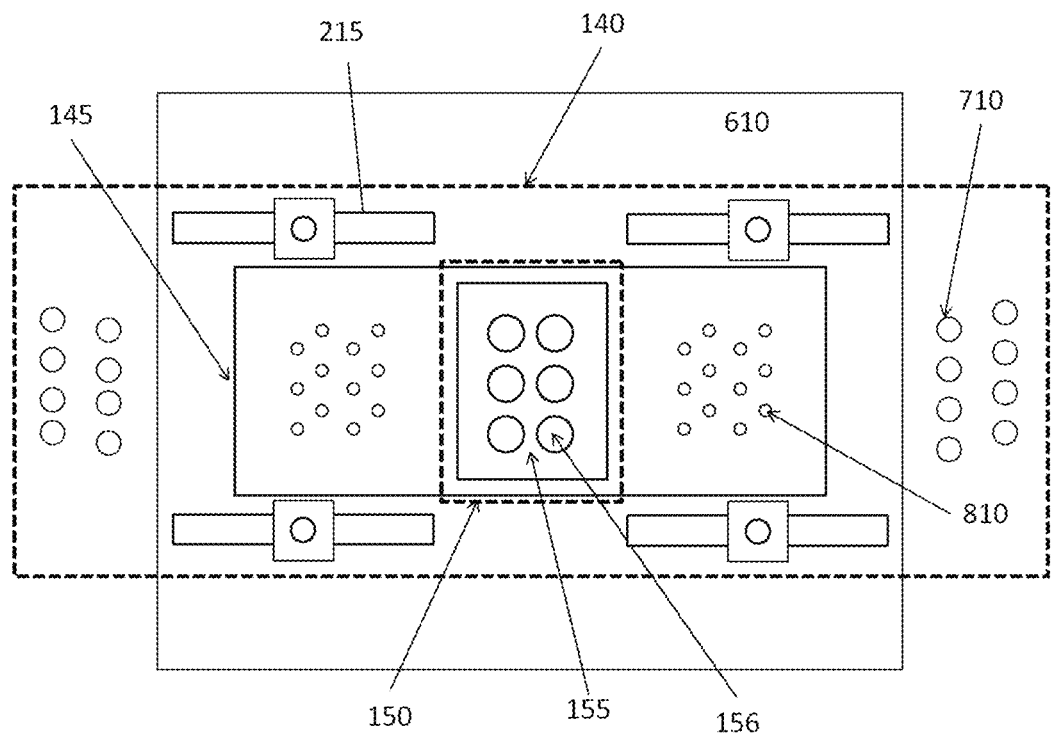

At step 1004, referring to FIG. 11d, the glass plates 155 and the lenses 156 are disposed in the cavity 150 of the support plate 140 and is mounted on the lower surface of the assembling plate 145.

Figure 11E:
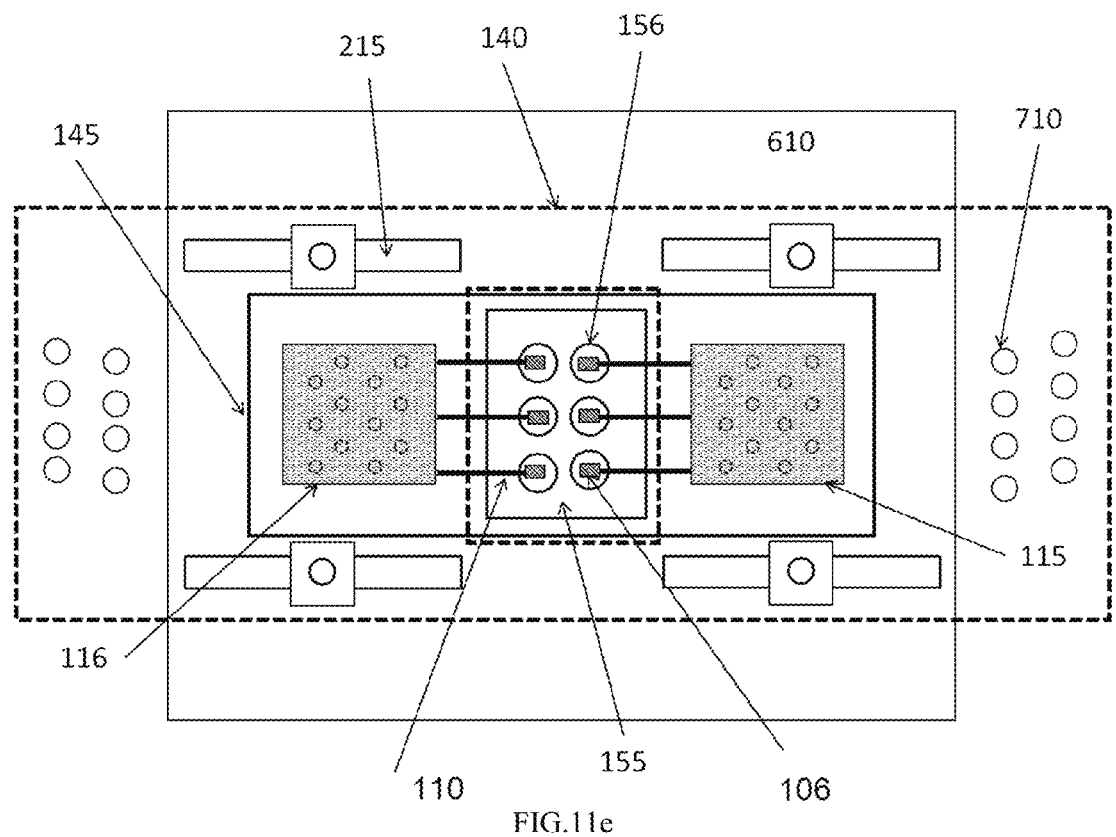

At step 1005, referring to FIG. 11e, the laser 105 and the photodetector 106 are welded to the upper surface of the assembling plate 145 using flip-chip welding without flux and are aligned with lenses 156 respectively. The amplifier chip 115 and the laser driver chip 116 are welded to the upper surface of the assembling plate 145 using flip-chip welding through bonding pads 810. The laser 105 and the laser driver chip 116 are connected to each other through the transmission lines 110. The photodetector 106 and the amplifier chip 115 are connected to each other through the transmission lines 110. The optical fibers 190 are mounted under the lower surface of the assembling plate 145, so as to achieve transmission of the optical signals from the transmitter of the laser 105 and receiving of the optical signals to the receiver of the photodetector 106.

Figure 11F:
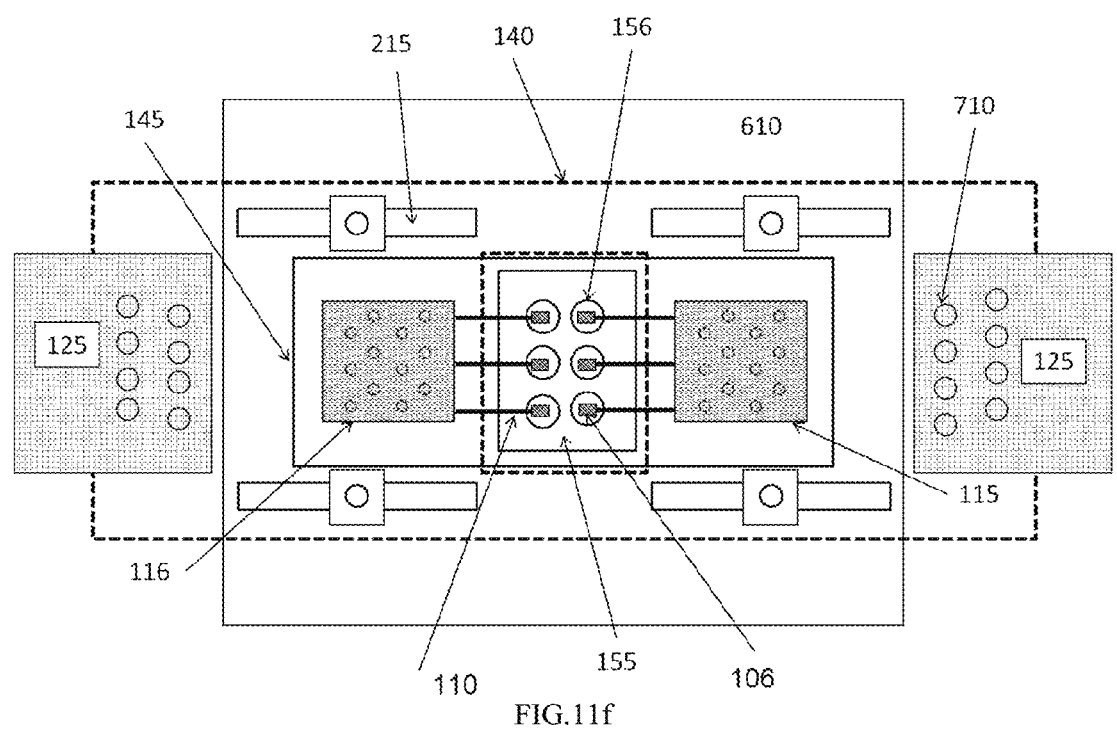

At step 1006, referring to FIG. 11f, the two I/O interfaces 125 are mounted on the upper surface of the support plate 140 and located at opposite sides of the support plate 140 respectively, the amplifier chip 115 and the laser driver chip 116 are connected to the I/O interfaces 125 through the transmission lines 110.

Figure 11G:
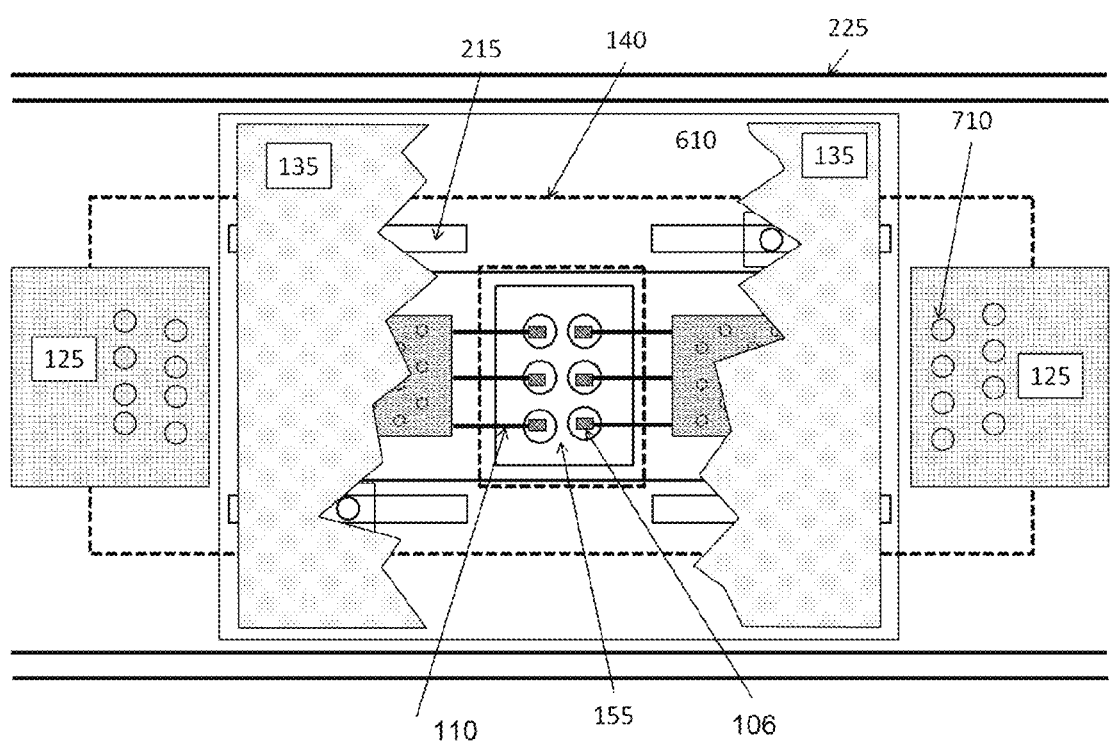

At step 1007, referring to FIG. 11g, the heat exchanger 135 is mounted above the laser driver chip 116 and the amplifier chip 115.

In an embodiment, contact pressure between the heat exchanger 135 and the heat sinks 230, as well as contact pressure between the amplifier chip 115, the laser driver chip 116 and the liquid fluid circulation region 120 may be adjusted by turning the screw 220 to change the position of the screw 220 in the threaded hole 210, so that efficiency of heat transfer can be adjusted.

With the optical communication apparatus and the method of assembling the optical communication apparatus, since the conducting vias 165 are formed in the assembling plate 145, the components of the optical communication apparatus can be connected to each other with transmission lines 110 passing through the conducting vias 165. Accordingly, the use of vertical space is optimized, the cost of the apparatus and difficulty of the assembling process is decreased, and the volume of the optical communication apparatus is minimized.

In addition, since the assembling plate 145 may be formed of a transparent material, the laser 105 and the photodetector 106 can communicate with the optical fibers 190 which are arranged in the vertical direction directly, therefore the cost of the apparatus is further decreased.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. An optical communication apparatus, comprising a laser, a laser driver chip, a photodetector, an amplifier chip, an assembling plate and at least two I/O interfaces,
    wherein the laser, the laser driver chip, the photodetector and the amplifier chip are disposed on an upper surface of the assembling plate; the laser is connected to the laser driver chip via transmission lines and the photodetector is connected to the amplifier chip via transmission lines;
    wherein a plurality of conducting vias are formed in the assembling plate, the laser driver chip and the amplifier chip are respectively connected to different I/O interfaces via transmission lines passing through the conducting vias; and
    wherein a transmitter of the laser is connected to an optical fiber disposed under a lower surface of the assembling plate to transmit optical signals, and a receiver of the photodetector is connected to another optical fiber disposed under a lower surface of the assembling plate to receive optical signals.

2. The apparatus according to claim 1, further comprising two lenses disposed under the assembling plate and aligned with the laser and the photodetector respectively.

3. The apparatus according to claim 2, further comprising an optical fiber alignment template plate having two via holes, wherein the optical fiber connected to the transmitter of the laser and the optical fiber connected to the receiver of the photodetector pass through the two via holes respectively and are aligned with the two lenses respectively.

4. The apparatus according to claim 2, further comprising a support plate for supporting the assembling plate and the I/O interfaces; wherein the support plate has a cavity and the lenses are located in the cavity.

5. The apparatus according to claim 2, further comprising two glass plates disposed under the assembling plate to support the two lenses respectively.

6. The apparatus according to claim 1, wherein a wavelength of waves which are allowable to pass through the assembling plate is the same as a wavelength of waves emitted by the laser.

7. The apparatus according to claim 1, further comprising a heat exchanger fitting with at least one of the laser driver chip and the amplifier chip.

8. The apparatus according to claim 7, wherein the heat exchanger comprises a liquid fluid circulation region fitting with at least one of the laser driver chip and the amplifier chip and a gaseous fluid circulation chamber surrounded by the liquid fluid circulation region.

9. The apparatus according to claim 8, wherein a net-shape structure formed of a fiber material is formed in the liquid fluid circulation region.

10. The apparatus according to claim 7, further comprising a heat sink on the heat exchanger.

11. The apparatus according to claim 10, wherein the heat sink has a shape of a fin.

12. The apparatus according to claim 7, further comprising a cage wall in which the laser, the laser driver chip, the photodetector, the amplifier chip and the assembling plate are accommodated.

13. The apparatus according to claim 12, wherein the cage wall has an opening under which the heat exchanger is disposed.

14. The apparatus according to claim 12, further comprising at least two adjustable spring mechanisms for adjusting vertical movement of the assembling plate, wherein the at least two adjustable spring mechanisms are disposed on a bottom plate of the cage wall.

15. The apparatus according to claim 14, wherein each of the adjustable spring mechanisms comprise a screw, a threaded hole through which the screw passes and a spring supporting the assembling plate as the screw moves in the threaded hole.

16. The apparatus according to claim 15, further comprising at least two supporting members through which the at least two adjustable spring mechanisms are respectively connected to a support plate supporting the assembling plate and the I/O interfaces.

17. The apparatus according to claim 1, wherein the assembling plate is formed of a transparent material.

18. A method of assembling an optical communication apparatus, comprising:

preparing an assembling plate having conducting vias;

disposing a laser driver chip and an amplifier chip on an upper surface of the assembling plate;

disposing a laser on the assembling plate, connecting the laser to the laser driver chip with electrical transmission lines, and connecting the laser to an I/O interface with electrical transmission lines passing through the conducting vias;

disposing a photodetector on the assembling plate, connecting the photodetector to the amplifier chip with electrical transmission lines, and connecting the photodetector to another I/O interface with transmission lines passing through the conducting vias; and connecting a transmitter of the laser to an optical fiber disposed under a lower surface of the assembling plate to transmit optical signals, and connecting a receiver of the photodetector to another optical fiber disposed under a lower surface of the assembling plate to receive optical signals.

19. The method according to claim 18, wherein connecting a transmitter of the laser to optical fibers to transmit optical signals and connecting a receiver of the photodetector to optical fibers to receive optical signals comprises:

disposing two glass plates under the assembling plate;

disposing two lenses aligned with the laser and the photodetector respectively on the two glass plates respectively;

welding a lower surface of the assembling plate to a support plate having a cavity, the two lenses being located in the cavity;

disposing an optical fiber alignment template plate having two dual diameter holes under the support plate, the two via holes being aligned with the two lenses respectively; and inserting the optical fibers into the two dual diameter holes respectively to connecting the optical fibers to the transmitter of the laser and the receiver of the photodetector respectively.

20. The method according to claim 18, wherein the assembling plate is formed of a transparent material.

* * * * *